(No Model.)

D. M. SOMERS & J. SPERRY.

MECHANICAL MOVEMENT.

No. 261,178. Patented July 18, 1882.

3 Sheets—Sheet 1.

Attest:
F. H. Schott
A. R. Bonn

Inventor:
Daniel M. Somers
John Sperry
per John C. Tasker Atty (No Model.)　　　　　　　　　　　　　　　　　　　　　3 Sheets—Sheet 2.
D. M. SOMERS & J. SPERRY.
MECHANICAL MOVEMENT.
No. 261,178.　　　　　　　　　　　　Patented July 18, 1882.
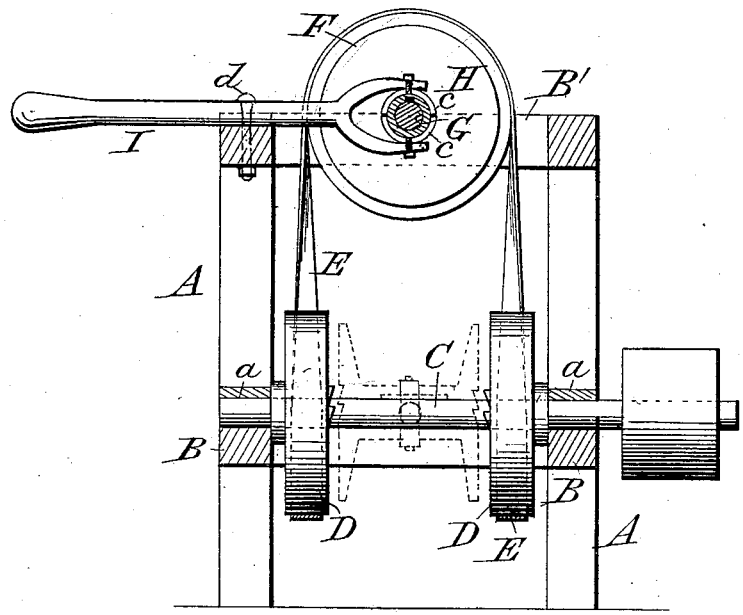
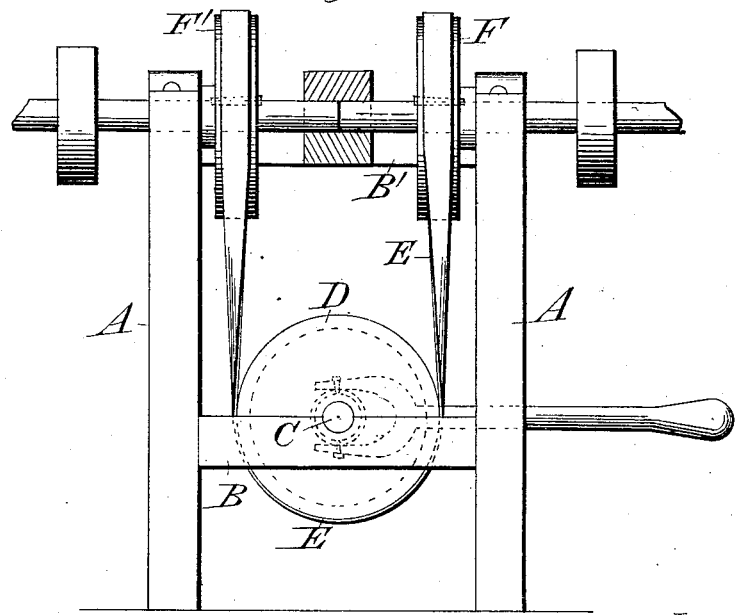
Attest:
F. H. Schott.
N. R. Brown.
Inventor:
Daniel M. Somers.
John Sperry,
by John C. Taskwelty.

(No Model.) 3 Sheets—Sheet 3.
D. M. SOMERS & J. SPERRY.
MECHANICAL MOVEMENT.
No. 261,178. Patented July 18, 1882.
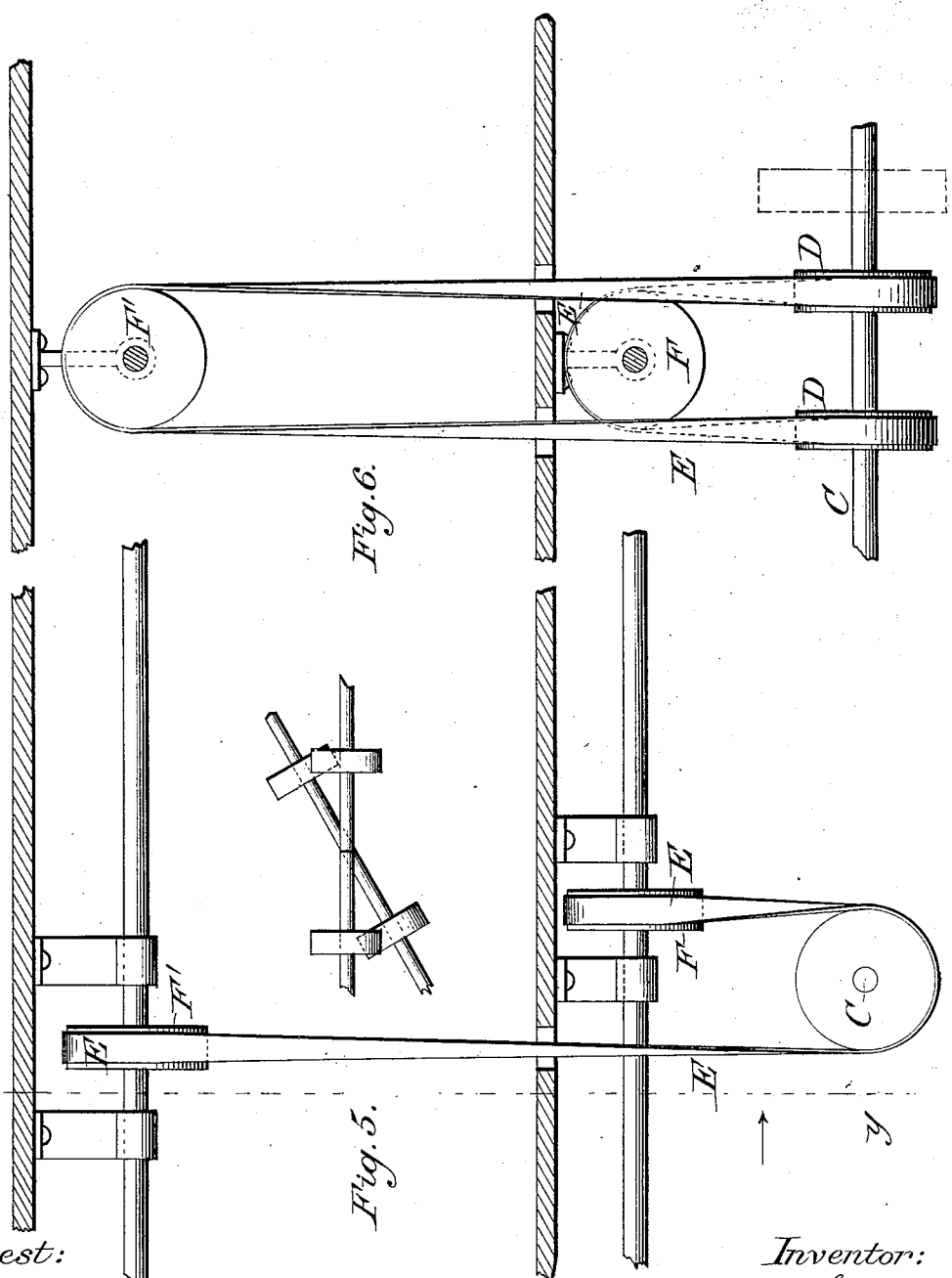
Attest:
F. H. Schott.
A. R. Brown.
Inventor:
Daniel M. Somers.
John Sperry

UNITED STATES PATENT OFFICE.

DANIEL M. SOMERS AND JOHN SPERRY, OF BROOKLYN, NEW YORK.

MECHANICAL MOVEMENT.

SPECIFICATION forming part of Letters Patent No. 261,178, dated July 18, 1882.

Application filed October 30, 1880. (No model.)

*To all whom it may concern:*

Be it known that we, DANIEL M. SOMERS and JOHN SPERRY, citizens of the United States, residing at Brooklyn, in the county of Kings and State of New York, have invented certain new and useful Improvements in Mechanical Movements; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to that class of mechanical movements usually called "belt-gearing," the object being to so arrange a system of pulleys upon shafts that a single belt shall be capable of transmitting power from one shaft to another at right or other desirable angles to the first, or to reverse the movement of one part of a line of shafting with relation to the remainder, and these results are attained without the employment of cog-gearing of any kind or the use of quarter-turn belts as ordinarily employed; and the invention consists in the construction and arrangement of the shafts and pulleys in the manner hereinafter described, and as will be specifically stated in the claims.

Figure 1:
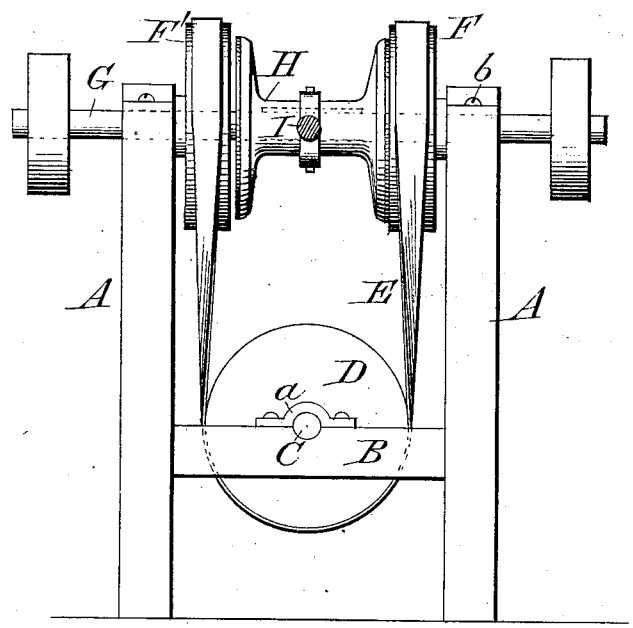
Figure 2:
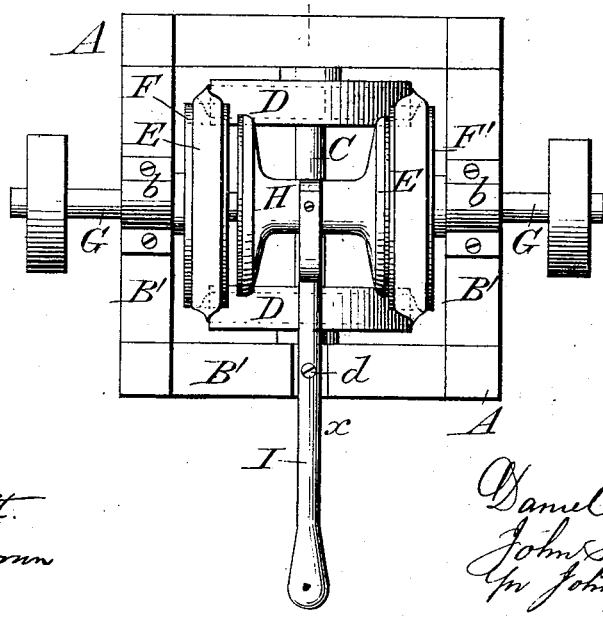

In the accompanying drawings, Figure 1 is a side elevation, showing a horizontal lower shaft united by the belt and pulleys, with two others placed at right angles to the lower shaft above it and in the same axial line with relation to each other. Fig. 2 is a plan showing the shafts and pulleys illustrated in Fig. 1, and also a clutch mechanism placed upon the upper shafts and the devices by which it is operated. Fig. 3 is a vertical section on the line *x x* of Fig. 2, presenting an additional view of the clutch-operating devices. Fig. 4 is a side elevation, showing divided shafts. Fig. 5 illustrates how the invention may be applied to drive shafting on different floors. Fig. 6 is a sectional view of the same on the line *y y* of Fig. 5.

The drawings show but one of the many methods of arranging the shafts and pulleys to accomplish the desired result which we may employ; but we have selected this for the illustration of the invention as being more easily explained and understood than some others, and will therefore proceed to describe the apparatus fully as shown in the drawings.

A rectangular frame, composed of the corner-posts A A, united near their lower ends by the girts B B, which form bridge-trees for the support of the bearings of the lower shaft, and connected at their tops in pairs by the girts B' B', carrying the journal-boxes of the upper shafts, constitutes the frame-work upon which the running parts are all carried. These consist of the hereinafter-described elements, viz: a shaft, C, revolving in journal-bearings *a a* upon the girts B, said shaft being provided with the two band-pulleys D D, which carry the lower loops of the band or belt E. The upper loops of this belt pass over the pulleys F F', secured upon the shaft G, and in such a manner as to revolve freely thereon. This shaft revolves in the journal-bearings *b b* upon the top of the frame, as shown in Fig. 2 of the drawings. We use any form of clutch to apply the power, and have shown in the drawings two forms—one a friction, suitable for counter-shafts that run at high rates of speed, the other a lock for main shafts where great strength and positive movement are required.

The clutch H in Figs. 1 and 2 is operated by a shifting-lever, I, one end of which is forked and embraces the sleeve of the clutch, to which it is connected by two half-rings, *c c*, which fill a groove formed for their reception in the sleeve. The shifting-lever is pivoted to the frame-work at *d* in such a manner that a slight movement of its outer end will throw the clutch into engagement with either of the pulleys F or F'; or it may be placed at a point between them that will not affect the free revolution of either.

It will be apparent that this construction and arrangement of parts may be greatly varied to suit the different purposes to which it may be applied. For instance, if it be desired to run the counter-shaft at a greater or less speed than the main shaft, then the diameter of the pulley will be increased or diminished to accomplish the desired result. These shafts may be composed of two lengths in each line, with their several pulleys securely fixed thereon, and meeting, or nearly so, in a center between the pulleys, as shown in the drawings in Fig. 4, in which case the divided line will rotate in opposite directions; or they may be continuous, having one pulley on each shaft fixed so as to rotate with the shaft, and the others (one on each shaft) turning loosely thereon. This will be apparent when it is seen that the two pulleys on each line of shafting rotate in opposite directions. If upon either line of shafting a central friction or other clutch is placed between the pulleys and so operated as to engage with either of them, the shaft will be made to rotate in the same line as the pulley brought in contact therewith; hence by reversing or changing the clutch from one pulley to the other a reversion of the motion is secured. By this mode of belting and transmitting power the motor may be placed directly under and at, or nearly at, right angles to the line of shafting to be driven. If in a basement, one line of shafting with driver may furnish the power for the room or story, while another line of shafting running parallel with it and directly over it in the next story may be driven by one and the same belt; but it will be apparent that the shafting in the second story will turn the opposite way from that in the first, and, further, it will be seen that to attain the proper length and elasticity of belt it is not necessary to separate the shafts widely apart, while equally good results may be obtained by placing them in quite close proximity—for instance, if a portable engine were placed in a loft of ordinary height there will be sufficient room to hang the shaft directly above and over it and preserve the proper length and elasticity of belt.

It will be obvious that the system may be employed in any position desired, so as to transfer power from vertical to horizontal shafts, or to shafts crossing each other, and that the belts will have a free equable motion on the pulleys, relieved from that edge-strain so destructive to the ordinary quarter-twist belts.

It will also be observed that the alignment of the pulleys is such as to give a free natural movement to the belt, preventing all danger of its being thrown off when the motion is reversed.

Belts of any length, width, or material may be used with the machinery without interfering with its smooth movement.

Among the many purposes to which our invention may be applied with advantage may be mentioned the following—viz., elevators or hoisting machinery, as it can be used for hoisting or lowering without reversing the motion of the prime motor, counter-shafts for lathes, planers, and all other machinery in which an increase or decrease of speed, change of direction or a reversal of the rotary motion is required.

Having thus described our invention, we claim as new, and desire to secure by Letters Patent of the United States, the following:

1. In a mechanical movement, the combination of a system of pulleys arranged on two or more shafts, an endless belt connecting said pulleys, and a clutch adapted to slide on the motor-shaft between its pulleys, substantially as shown and described.

2. In a mechanical movement, the combination of a shaft having two pulleys, two additional shafts, each provided with a belt-pulley, arranged in axial line with each other and at an angle to the first shaft, and an endless belt connecting the pulleys on said shafts, substantially as shown and described.

3. In a mechanical movement, the combination of a shaft provided with two pulleys, two shafts in axial line, each provided with a fixed pulley, an endless belt connecting the several pulleys, and a clutch sliding upon the motor-shafts in axial line between their respective pulleys and engaging therewith, substantially as shown and described.

In testimony whereof we affix our signatures in presence of two witnesses.

DANIEL M. SOMERS.
JOHN SPERRY.

Witnesses:
JOS. L. SOMERS,
GEO. R. WEED.